United States Patent

Frank et al.

[11] Patent Number: 5,875,816
[45] Date of Patent: Mar. 2, 1999

[54] FUEL FEEDING MODULE WITH INTEGRATED FUEL FINE FILTER

[75] Inventors: Kurt Frank, Schorndorf; Hans-Peter Braun, Renfrizhausen, both of Germany

[73] Assignee: Robert Bosch GmbH, Stuttgart, Germany

[21] Appl. No.: 811,376

[22] Filed: Mar. 4, 1997

[30] Foreign Application Priority Data

May 17, 1996 [DE] Germany ................... 196 19 922.1

[51] Int. Cl.⁶ .................................................. F02M 37/14
[52] U.S. Cl. ..................... 137/549; 137/565; 137/574; 123/510; 417/363
[58] Field of Search ..................... 123/509, 510, 123/514; 417/363; 137/565, 574, 545, 549

[56] References Cited

U.S. PATENT DOCUMENTS

| | | | |
|---|---|---|---|
| 2,857,849 | 10/1958 | Pezzillo | 417/361 |
| 3,143,284 | 8/1964 | Lindsjo et al. | 417/363 |
| 4,878,518 | 11/1989 | Tuckey | 123/510 |
| 5,046,471 | 9/1991 | Schmind | 123/510 |
| 5,392,750 | 2/1995 | Laue et al. | 417/363 |
| 5,482,444 | 1/1996 | Coha et al. | 417/363 |

FOREIGN PATENT DOCUMENTS

| | | |
|---|---|---|
| 43 36 574 A1 | 5/1995 | Germany . |
| 44 14 281 A1 | 10/1995 | Germany . |
| 195 35 668 A1 | 3/1996 | Germany . |

OTHER PUBLICATIONS

Kasedorf, J./Benzineinespritzing und Katalysator. . . /pp.115–116.

*Primary Examiner*—A. Michael Chambers
*Attorney, Agent, or Firm*—Michael J. Striker

[57] ABSTRACT

A fuel feeding module has a fuel pump, a coarse fuel filter, a fine fuel filter, a storage cup to be arranged on a bottom of a fuel tank, the fuel pump with the coarse fuel filter being surrounded by the storage cup, the storage cup having a wall which at least in portions is formed double-walled, the individual walls together forming a completely enclosed intermediate chamber in which the fine fuel filter is arranged, the intermediate chamber having a supply connection connected with a pressure connection of the fuel pump in a region of the fine filter and also having a discharge connection in a region of the fine filter.

10 Claims, 2 Drawing Sheets

FUEL FEEDING MODULE WITH INTEGRATED FUEL FINE FILTER

BACKGROUND OF THE INVENTION

The present invention relates to a fuel feeding module with integrated fuel fine filter arranged in a fuel tank.

In motor vehicles partially fuel pumps are utilized, which are installed in the interior of the fuel tank. In order to guarantee the situation that with the fuel pumps located mainly on the fuel tank bottoms also during partially emptied fuel tank on curved travel and/or sight travel a reliable supply of fuel is guaranteed, the fuel pump is built in a so called storage cup which maintains the fuel level directly around the fuel pump on a predetermined level. The storage cup is filled for example by a suction jet pump from the fuel tank bottom. As a driving agent, the fuel returned from the internal combustion engine is utilized. The returned fuel can however flow back also directly into the storage cup.

On the way to the internal combustion engine the fuel as a rule flows through two different fuel filters. The first, coarse-pore filter is located at a suction side on the fuel pump integrated in the storage cup. The second, fine-pore filter is arranged after the fuel pump and located outside the fuel tank. This is disclosed for example in Jurgen Kasedorf, "Benzineinespritzung und Katalysatortechnik, Vogel Buchverlag", first edition, 1995, page 115 in connection with page 116.

SUMMARY OF THE INVENTION

Accordingly, it is an object of present invention to integrate a fuel tank fine-filter in a fuel feeding module.

For this purpose the storage cup, with reference to the height and to the periphery, is formed at least locally double-walled. The fuel fine filter is located in an in an intermediate space which is completely enclosed by a double wall. Hydraulically it is arranged after the fuel pump.

By the location of the fuel fine filter in the storage cup, the manufacture of a separate fine filter housing together with its screw connections is dispensed with. Also, the separate mounting of the fine filter housing on the vehicle chassis is dispensed with. In addition, the number of the hydraulic connections located outside the fuel tank is reduced, and thereby the fuel leakage danger is diminished.

Furthermore, in the storage cup whose outer dimensions are greater than the dimensions of a conventional fine filter housing, a fuel fine filter with considerably greater filter surface can be utilized. Thereby, among other advantages, the service life of the fine filter is increased so that such a fine filter is sufficient for a complete vehicle service life.

With the inventive fuel feeding module, also the number of parts and the mounting costs are reduced, and additionally the mounting space outside the fuel tank is saved.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
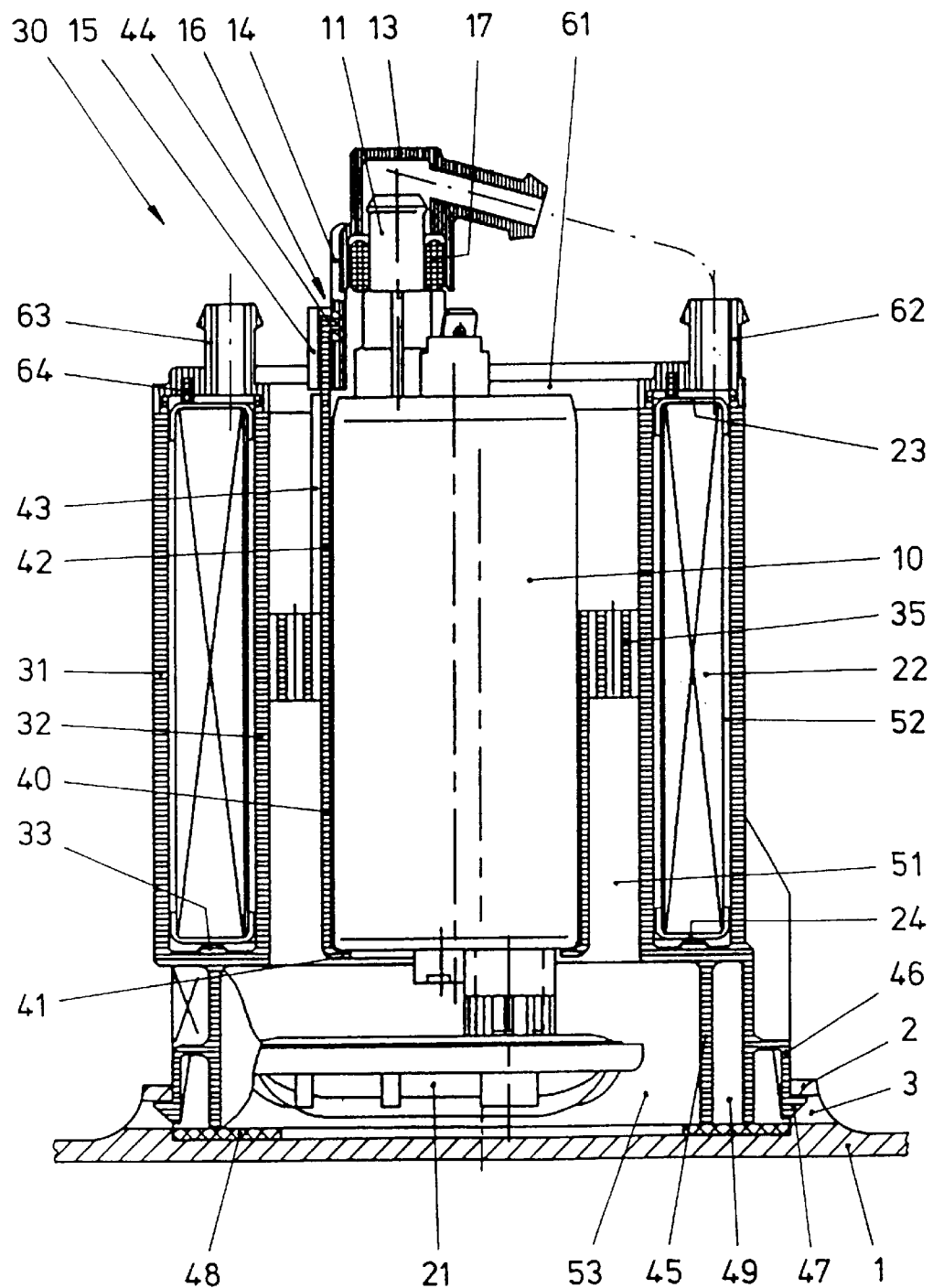
FIG. 1 is a view showing a fuel feeding module with a sectioned storage cup in accordance with the present invention.

A fuel feeding module in accordance with present invention as shown in FIG. 1 has a storage cup 30 which is arranged on a bottom 1 of a fuel tank and has an integrated electric fuel pump 10 and two fuel filters 21 and 22. The electric fuel pump 10 aspirates fuel from an inner chamber 51, 53 of the storage cup 30 through a fuel coarse filter 21 and supplies it through a fuel fine filter 22 into a fuel conduit which leads to an internal combustion engine.

The storage cup 30 is formed in principle as a tubular element which is composed for example of a fuel-resistant synthetic plastic material. Its upper region surrounds a cylindrical outer wall 31 and a concentrically arranged inner wall 32. The outer wall and the inner wall are connected by a bottom 33 and a filter housing cover 61 so as to be impermeable for fuel. All four parts surround a fine filter chamber 52.

The filter housing cover 61 is fixed on the outer and inner walls 31, 32, for example non-releasably by glueing or ultrasound welding. It surrounds with its edges both walls 31, 32. The fine fuel filter 22 is accommodated in a chamber 52 between the walls 31 and 32.

The fuel filter 22 is formed for example as a surface filter which is folded in a star-shaped manner and has an average pore width of 10 $\mu$m. Its end surfaces are limited by caps 23 and 24 which separate the inlet side from the outlet side. The caps 23 and 24 in the fine filter chamber 52 have a lateral gap of several tenth millimeters.

The fine fuel filter 22 sits with the lower cap 24 on the bottom 33. The upper cap 23 is supported through an elastic separating seal 64 on the filter housing cover 61. In some cases, also a separating seal is arranged underneath. The upper separating seal 64 is located eccentrically to the fine fuel filter 22 in the filter housing cover 61. A supply connection 64 is formed on the filter housing cover 61 in the region between the separating seal 64 and the outer wall 31. A discharge connection 63 is arranged in the region between the separating seal 64 and the inner wall 32.

A holder 40 is supported on the inner wall 32 by at least two suspending elements 35. In the shown embodiment 3 suspending elements 35 are utilized. The electric fuel pump 10 is located in the holder 40. For this purpose the holder 40 is formed at least partially cup-shaped. In its lower region it has a bend 41. As shown in FIG. 1 it is provided with a collar arm 42 which is reinforced with a web 43 and has at least one arresting projection 44. The electric fuel pump 10 is located on the bend 41 and is insertable from above in the holder. The arresting projection 44 of the collar arm 42 engages in one of several arresting openings 16 provided on an inner pressure connection member 13. The pressure connection member 13 with a sealing ring 17 sealed, is arranged on the pressure connection 11 of the electric fuel pump 10. The arresting recesses 66 are provided in an arm 14 oriented toward the pump. An elastic angle 15 is arranged on the arm 14 opposite to the arresting openings 16. The elastic angle together with the arm 14 forms a guide and an arresting securing feature for the collar arm 42 of the holder 40. The angle 15 can be formed as a double angle or a bracket which completely surrounds the collar arm 42 in the region of the arresting openings 16. Thereby by plugging the pressure connecting element 13, the electric fuel pump is fixed in the holder 40.

The pressure connecting member 13 is hydraulically connected with the supply connection 62 in the filter housing cover 61 through a flexible conduit piece which is not shown in the drawings.

Figure 2:
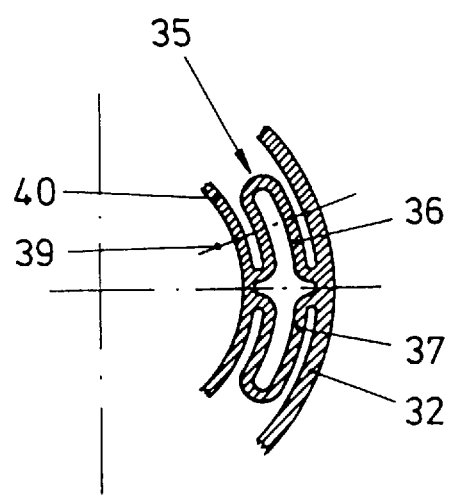
FIG. 2 is a view showing a suspending element for the inventive fuel feeding module, on a plan view.

One of the suspending elements 65 which supports the holder 40 in the inner wall 32 in a springy manner is shown in FIG. 2. The individual suspending element 35 is composed of two oppositely located and approximately U-shaped brackets 36 and 37. One leg of one bracket is mounted or formed on the holder 40 and on the inner wall 32. The mounting points of both brackets 36, 37 are located near one another. The brackets 36, 37 operate as bending springs when the holder 40 is moved directly on the inner wall 32 or insignificantly turned opposite to the inner wall 32. Furthermore, they operate as torsion springs, when the holder 40 or the electric fuel pump 10 swing around its longitudinal axis. The suspending elements 35 provide a noise-damping action because of their shape.

The dash-dot line 32 represents a section plane, in which two of the suspending elements 35 are shown in FIG. 1.

A coarse filter chamber 53 is located at the lower region of the storage cup. The coarse fuel filter 21 is arranged in the chamber 52 and mounted from below on the electric fuel pump. The coarse fuel filter 21 has for example a pore width of approximately 60 µm.

At the right side from the coarse fuel filter 21 the storage cup 10 is also formed double-walled. A fuel supply passage 49 is located between the outer wall 31 and an inner labyrinth wall 45. It connects the fuel supply tank with the storage cup 30 through a suction jet pump. The outer wall 31 and the labyrinth wall 45 are sealed to the bottom 1 of the fuel tank by a bottom seal 48. The bottom seal 48 is located for example between a ring-shaped connecting element 2 which in some cases is composed only of individual portions. The connecting element 2 has at least two arresting openings 3, in which the arresting projections 47 mounted by arresting hooks 46 on the storage cup 30 engage.

It is to be understood that the storage cup 30, instead of the arresting on the bottom 1 of the fuel tank, can also be supported against the upper tank wall or a cover integrated in it. Moreover, it is possible to integrate the connecting element 2 in a separate closure plate, so that the closure plate for example together with the bottom seal 48 form a mountable bottom for the storage cup 30.

The filter fuel is supplied through the discharge connection 63 arranged on the filter housing cover 61, for example by a hose conduit. The fuel which is not required there, is in some cases returned to the drive of the suction jet pump arranged on the storage cup 30. The hose conduit, the pressure regulating valve and the suction jet pump are not shown in the drawings.

It will be understood that each of the elements described above, or two or more together, may also find a useful application in other types of constructions differing from the types described above.

While the invention has been illustrated and described as embodied in fuel feeding module with integrated fuel fine filter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fuel feeding module, comprising a fuel pump; a coarse fuel filter; a fine fuel filter; a storage cup to be arranged on a bottom of a fuel tank, said fuel pump with said coarse fuel filter being surrounded by said storage cup, said storage cup having a wall which at least in portions is formed double-walled composed of individual walls, said individual walls together forming a completely enclosed intermediate chamber having a supply connection which is connected in a fine filter inlet region with a pressure connection of said fuel pump and also having a discharge connection in a fine filter outlet region; and an inner chamber operating as a storage chamber, said inner chamber accommodating said coarse fuel filter and said fuel pump and receiving fuel from the fuel tank.

2. A fuel feeding module as defined in claim 1, wherein said individual walls of said storage cup are arranged at least in portions coaxially to one another.

3. A fuel feeding module as defined in claim 1, wherein said storage cup is bottomless.

4. A fuel feeding module as defined in claim 1, wherein said storage cup has a central region and is provided in said central region with a holder which at least in a portion is adjusted to an outer contour of said fuel pump and at least in a portion engages said fuel pump.

5. A fuel feeding module as defined in claim 4, wherein said holder is elastically suspended on said storage cup.

6. A fuel feeding module as defined in claim 5; and further comprising elastic suspending elements for suspending said holder on said storage cup.

7. A fuel feeding module as defined in claim 6, wherein said storage cup, said holder for said fuel pump and said elastic suspending elements are formed as a one-piece element.

8. A fuel feeding module as defined in claim 4, and further comprising a pump pressure connection; and a connecting piece which arrests said fuel pump in said holder with said pump pressure connection.

9. A fuel feeding module as defined in claim 1, wherein said storage cup has a lower region and is provided in said lower region with at least two arresting projections for fixing on a fuel tank bottom.

10. A fuel feeding module as defined in claim 1, wherein said individual walls include an inner wall and an outer wall, said completely enclosed intermediate chamber which accommodates said fine fuel filter being formed between said inner wall and said outer wall, said inner chamber operating as a storage chamber and accommodating said coarse fuel filter and said fuel pump being located inside said inner wall.

* * * * *